United States Patent [19]

Palmer

[11] 3,917,226
[45] Nov. 4, 1975

[54] PORTABLE INDIVIDUAL WHEEL RAMPS

[76] Inventor: Raymond Greig Palmer, Linden House, Linden Road, Sunderland, England

[22] Filed: Oct. 9, 1973

[21] Appl. No.: 404,731

[30] Foreign Application Priority Data
Oct. 6, 1972 United Kingdom............... 46251/72
May 11, 1973 United Kingdom............... 22503/73

[52] U.S. Cl. .................................................. 254/88
[51] Int. Cl.². ........................................... E02C 3/00
[58] Field of Search ............... 254/88; 214/16.1 RE; 52/175

[56] References Cited
UNITED STATES PATENTS
2,695,568  11/1954  Keith............................. 214/16.1 R 2,758,552   8/1956  Browne.......................... 214/16.1 R
3,216,530  11/1965  Hunter................................. 254/88
3,599,382   8/1971  Stone............................ 214/16.1 R Primary Examiner—Othell M. Simpson
Attorney, Agent, or Firm—Fleit & Jacobson

[57] ABSTRACT

Front and rear wheels of a vehicle are raised clear of the ground by driving forward onto one set of ramps and then backing onto another set of ramps while maintaining the already raised wheels at the level of the first ramps. The support of the first raised wheels can be by way of a bridge over the ramp riser track.

5 Claims, 7 Drawing Figures

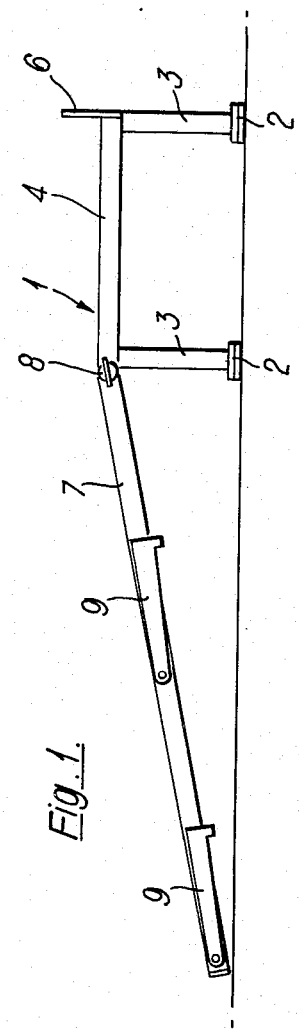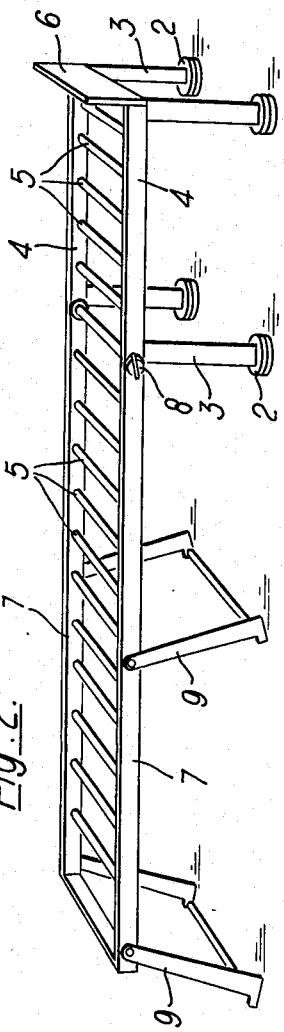

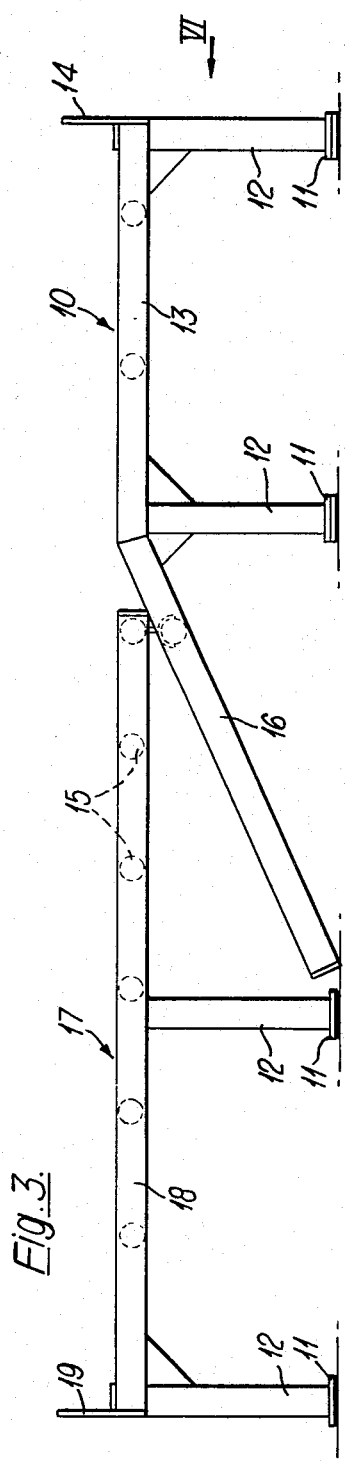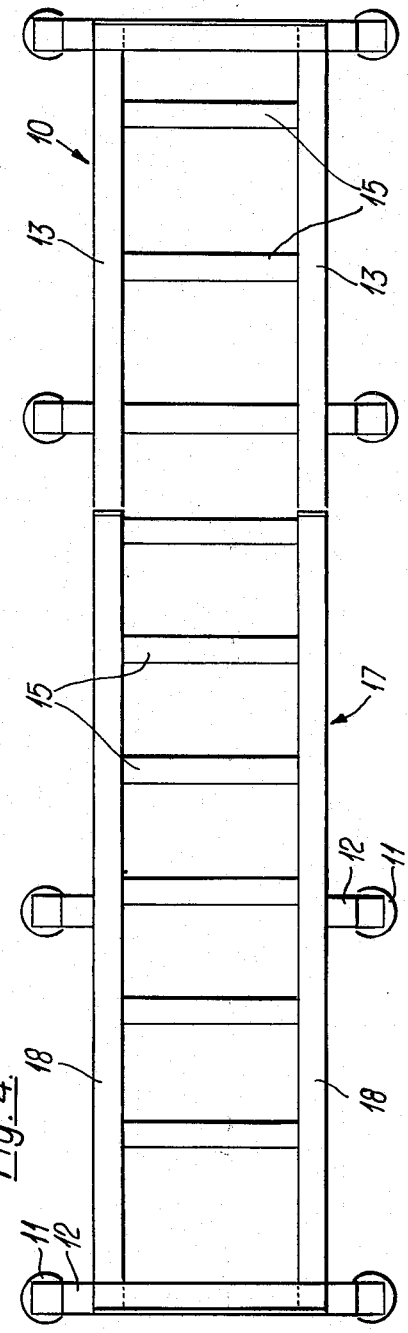

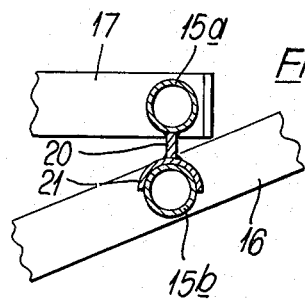
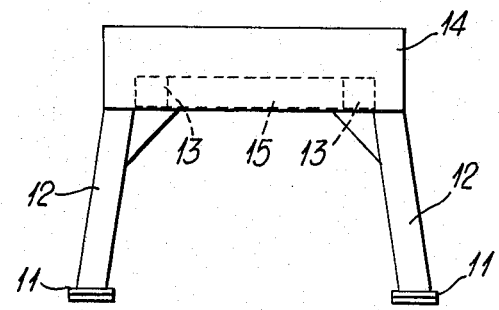
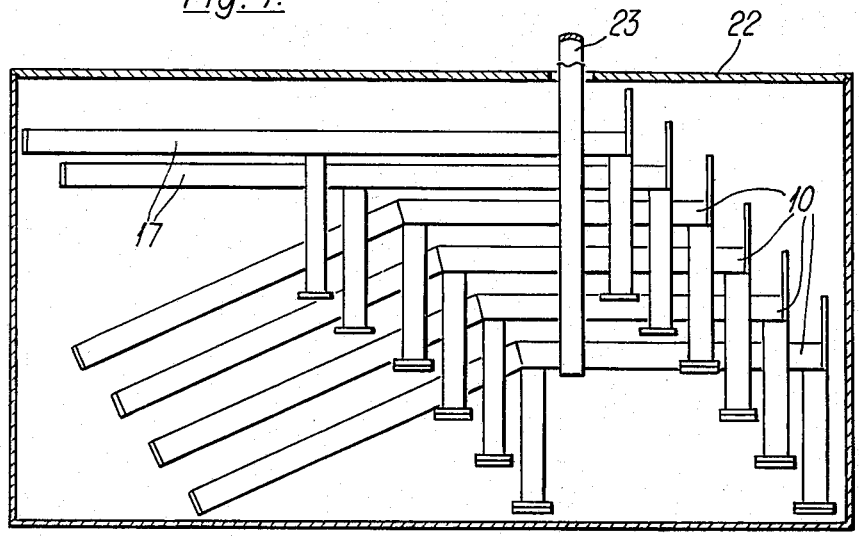

PORTABLE INDIVIDUAL WHEEL RAMPS

The present invention concerns improvements in and relating to ramps for vehicles and aims to enable the front and rear ground wheels of a vehicle to be lifted clear of a ground surface, for example for maintenance of the vehicle.

Conventional portable ramps used to provide space beneath the vehicle for inspection and working consist of individual units, one for each wheel to be raised, each defining a base to engage the ground surface, an inclined track portion which the vehicle wheel mounts in use, and a level platform track portion on which the vehicle wheel will be resting when in its raised position. Such ramps are of a convenient size and shape to be carried in a vehicle for use in an emergency, but they have the disadvantage that they cannot be used to lift both front and rear ground wheels of the vehicle clear of the ground to enable maximum ground clearance under the control of the vehicle and to provide easy access to both the front and the rear ends of the vehicle simultaneously.

It is also known to provide ramps in the form of two platforms placed side by side and each having a length in excess of the wheelbase dimension of the vehicle for accommodating front and rear wheels, for example the two nearside wheels of a car on one ramp and the two offside wheels on the other ramp. These ramps are space-consuming and expensive and do not provide the portability which can be obtained with the ramps of the present invention.

According to the invention there is provided apparatus for use in raising the front and rear ground wheels of a vehicle clear of a ground surface, such apparatus comprising a ramp have an inclined track portion and a platform track portion; and means for optionally providing an extension of said platform track portion above the location of said inclined track portion said extension having a length at least as great as that of the ramp platform track portion. The means for optionally providing an extension of the platform tracked portion may suitably comprise means for pivoting the inclined track portion about an axis at or near the junction between said inclined and platform tracked portions for movement between a first position in which it can be supported above said inclined track portion but parallel to said platform tracked portion, and a second position in which it is coincident with or below said inclined track portion. Alternatively the means for providing an extension of said platform track portion may conveniently comprise a bridge piece having a further platform track portion, means being provided for releasably connecting said bridge piece to said ramp with the two platform track portions parallel and located at the same height above a ground surface on which said ramp and bridge piece stand.

In order that the present invention may more readily be understood the following description is given, merely by way of example, reference being made to the accompanying drawings in which:

FIG. 1 is a side elevational view of a first form of the invention in which the inclined portion of a ramp can be raised to form a platform extension;

FIG. 2 is a perspective view showing the frame construction of the ramp of FIG. 1;

FIG. 3 is a side elevational view showing a ramp and a bridging piece of a second embodiment of the present invention;

FIG. 4 is a top plan view of the assembled ramp and bridging piece of FIG. 3;

FIG. 5 is a detail in sectional view showing the interconnection of the ramp and the bridging piece of FIGS. 3 and 4;

FIG. 6 is an end elevational view of the ramp of FIG. 3 viewed along the arrow VI;

FIG. 7 is a side elevational, partly schematic view showing a way in which a set of four ramps and two bridging pieces can be stacked in a carrying case for storage in a vehicle.

Referring now to FIGS. 1 and 2, there is shown a ramp unit 1 a pair of which can be used in combination with a pair of conventional individual wheel ramps (not shown) to enable the front and rear wheels of a vehicle to be raised simultaneously. Since the principle of the present invention is embodied only in the ramps at one end of the vehicle a customer can supplement an existing pair of ramps in order to enable all four wheels to be raised clear of the ground at the same time by the method of this invention.

The ramp 1 has four feet 2 secured to legs 3 so that the feet define a base which, in use of the ramp, will stand on a suitable ground surface. The ramp has two legs 3 and two feet 2 at each side and only one of these pairs can be seen in the side elevational view of FIG. 1. FIG. 2 shows the arrangement more clearly.

Above the base defined by the four feet 2 is a platform track defined by a pair of spaced longitudinal members 4 having extending therebetween an array of parallel circular section rods 5 for supporting a vehicle wheel. The right-hand end of the ramp has an end stop 6 to prevent a vehicle wheel from being driven off the right-hand end of the ramp during the mounting operation.

At the left-hand end of the platform is an inclined track portion defined by a pair of side members 7 having further bars 5 extending therebetween to provide a wheel support. The two side members 7 are pivotally connected to the side members 4 of the platform near the end of the platform by means of lockable clamps 8 which enable the inclination of the inclined portion to be varied between the horizontal configuration shown in FIG. 2 and the steepest inclination shown in FIG. 1.

When the side members 7 are in the horizontal configuration of FIG. 2 they are additionally supported by one pair of pivotable legs 9 near the centre of the inclined portion and a further pair of pivotable legs 9 at the free end. As shown in FIG. 1, these legs 9 fold up when the side members 7 are in the inclined configuration so that this particular ramp unit 1 is readily convertible from the conventional ramp configuration to a continuous platform of substantially the same overall height and length.

The operation of these ramp units 1 is as follows:

First of all two ramp units 1 are positioned to support and be mounted by the wheels of the vehicle at one end, for example the front end, and the vehicle is then driven forward so that the wheels of that end mount first of all the inclined track portions 5, 7 and then the platform track portions 4, 5 until the driver senses contact of his ground wheels with the stop 6.

At this point he applies the handbrake and then arranges for a pair of conventional ramps to be placed under the other end of the vehicle to be mounted by the wheels which are still on the ground. He also arranges for the inclined track portions 5, 7 of the two ramp units 1 to be raised to the horizontal configuration so that the two pairs of swinging legs 9 drop down into contact with the ground so that when the clamps 8 are locked the track portions 5, 7 are held in the horizontal configuration.

The vehicle can then be driven back in the direction opposite to that used to mount the ramps 1 and in so doing the wheels at the other end, the rear end, of the vehicle will mount the conventional ramps. In so doing, the vehicle will eventually arrive at a configuration in which the rear wheels are firmly placed on the platform of the conventional ramps and the front wheels are still securely supported by the horizontal platform extension formed by the track members 5, 7, supported by their four legs 9.

With this particular embodiment of the present invention either end of the vehicle can be driven up onto the ramp units 1, but it will of course be important that the ramp units 1 of the present invention should be used as the first pair of ramps and the conventional ramps be used subsequently. It is of course possible to employ four of the units 1 if a pair of conventional ramps is not immediately available. However, the conventional ramps will presumably be more compact and will be cheaper in construction and thus even where a set of four ramps is on sale simultaneously it is expected that two will be of the form illustrated in FIGS. 1 and 2 and the other two will be of a conventional rigid form.

In FIGS. 3 to 7 there is illustrated an alternative form of the ramp unit which works on much the same principle as the embodiment of FIGS. 1 and 2. However, in this instance the platform extension is formed by an entirely separate bridging piece which can be connected to the ramp unit, rather than by a pivotable inclined portion of the ramp unit itself.

FIG. 3 shows in side elevational view the ramp unit 10 as having four feet 11 on legs 12 which are secured to horizontal side members 13 forming the platform whose end stop is here referenced 14. The platform track structure is completed by tubes 15 extending across the ramp unit 10.

The inclined track portion of the ramp unit is formed by a further pair of side members 16 again interconnected by circular section tubes 15.

The platform extension for the ramp unit is formed by a separate bridging piece 17 consisting of side members 18 having further bars 15 secured therebetween, and the bridging piece is equipped with further feet 11 and legs 12 as well as having its own end stop 19 at the left-hand end.

As can be seen from the end view of FIG. 6, the end stops 14 and 19 are in the form of steel plates welded to the end pair of legs 12; the longitudinally extending side members 13, together with the further side members 16 and 18, are in the form of square sectioned tubes.

Various reinforcing gussets are used to strengthen the welds between the various legs 12 and the respective side pieces 13, 16 and 18.

FIG. 5 shows in detail the interconnection of the bridging piece 17 to the ramp unit 10 and from this view it can be seen that the wheel-supporting bar 15a at the right-hand end of the bridging piece, incidentally formed as a circular-sectioned steel tube, has welded thereto a downwardly projecting plate 20 carrying a semi-circular cross-section cradle piece 21 which preferably extends right across the width of the ramp and sits on a corresponding cross bar 15b at the top of the inclined track portion of the ramp unit 10. Since the length of the cradle 21 is the same as that of the bar 15b, the ends of the cradle fit neatly between the side pieces 16 of the ramp inclined track portion and prevent any lateral relative movement between the ramp unit 10 and the bridging piece 17. Similarly, the cooperating cylindrical surfaces of the cradle 21 and the bar 15b avoid any longitudinal relative movement. Provided all eight of the feet of the combination of the ramp unit 10 and the bridging piece 17 stand on firm flat ground, the combination of the ramp unit 10 and the bridging piece 17 forms a safe load-bearing structure capable of supporting a vehicle wheel at any point along the platform of the ramp unit 10 and that of the bridging piece 17.

The method of using the embodiment of FIGS. 3 to 7 will be self-explanatory bearing in mind the description above with reference to FIGS. 1 and 2. The only difference is that, instead of pivoting and locking the inclined portion of the ramp after the first pair of wheels has mounted the platform track portion of the ramp unit 10, it is necessary to place the bridging piece 17 in engagement with the ramp unit 10 so that the platforms of the bridging piece and the ramp unit form a continuous horizontal wheel-supporting track.

FIG. 7 shows how a set of four ramp units 10 and two bridging pieces 17 can be stacked together in a carrying case 22 to form a compact set of ramps.

By virtue of the downwardly divergent arrangement of the legs 12 (clearly visible from FIG. 6) the four ramp units 10 are readily stackable one upon another as shown in FIG. 7. The legs of the bridging pieces 17 are similarly downwardly divergent so that they too can sit on top of the ramp units and the assembly of the four ramp units 10 and the two bridging pieces 17 forms a generally rectangular parallelipipedonal assembly which is conveniently encased in the carrying case 22. Strapping 23 is secured around the platforms of the ramp units and bridging pieces as shown in FIG. 7 and provides a handle portion which extends upwardly through a rectangular aperture in the box.

Before the box is opened it will of course be necessary to push down the strapping 23 through the slot back into the box to allow the ramp units 10 and bridging pieces 17 to be withdrawn from one or other of the ends of the box.

A set of ramps in a carrying case of this kind can usefully be kept in a vehicle ready for an emergency repair and may, for example, be part of the standard kit of tools carried in recovery vehicles of the motoring organisations.

When it is desired to lower the vehicle from the ramps with either of the embodiments of FIGS. 1 to 7, it is merely necessary to carry out in reverse the sequence of operations described for mounting the vehicle.

The apparatus of the present invention can be applied to raise one side only of a vehicle and to raise all types of vehicle including three-wheeled vehicles and vehicles having more than two wheels on each axle. In the latter case it will be preferable to provide a ramp unit for each of the wheels but it is possible to allow two or more adjacent wheels on an axle to mount the same wide ramp unit or even to carry the weight of the vehicle on only two of the wheels of that axle.

For a vehicle having more than two axles it is possible for the method of the present invention to be employed provided the axle layout permits positioning of the ramps for each axle but it is envisaged that vehicles of this size will have sufficiently high ground clearance for there to be little advantage in raising the wheels by the further increments possible with individual ramps. Where such a vehicle has a maintenance problem which requires additional ground clearance it is far more likely that the seriousness of the problem will be such that more sophisticated lifting gear will be available.

The apparatus of the present invention can be used by the private motorist in the form of a "first aid" pack in the vehicle boot, it can be carried as part of the tool kit of a recovery vehicle belonging to one of the motoring organisations, it can be part of a garage recovery vehicle kit, and may even be carried by military vehicles to enable servicing in the field. Additionally, small garages which do not have their own hydraulic lift device may well employ ramps of this sort as a quick way of increasing vehicle ground clearance for maintenance.

For improved compactness it is visualised that the ramp units of the present invention may be capable of being folded down but still providing a strong load-bearing structure when erected.

There are many owners of pairs of individual wheel ramps which are at present unsuitable for enabling all four wheels to be held clear of the ground at one time. This invention embraces the provision of two newly designed wheel ramps which can be used in conjunction with the pair of existing ramps so as to enable the owner to make good use of his conventional ramps in the system. Thus the conventional ramps can be converted for use with the four-wheel system now proposed.

If desired the frame of either of the above embodiments can be made from slotted angle iron, e.g. Dexion (R.T.M.). Equally, the track portions may be formed of expanded metal to provide a good tyre gripping surface.

I claim:

1. A wheel ramp for supporting a single corner of a vehicle when raising the ground wheels of all four corners of a vehicle clear of a ground surface, such ramp having base means; riser track means; platform track means; and extension means adapted to be placed in position manually while a vehicle wheel is supported on said platform track means for optionally providing an extension of said platform track means above said riser track means; and means for locking said extension means in position above said riser track means to bear the load of a vehicle wheel driven thereonto from said platform track means, said extension means having a length at least as great as that of the platform track means.

2. A wheel ramp as set forth in claim 1, wherein said extension means comprise pivot means mounting the riser track means for manual pivoting about an axis substantially at the junction between said riser and platform track means for movement between a first position in which it is parallel to said platform track means; and a second position in which it extends between and is inclined to both said base and platform track means; and said means for locking said riser track means in said first position for supporting the weight of the vehicle comprise leg means for supporting said riser track means clear of the ground in said first position.

3. A wheel ramp as set forth in claim 1, wherein the extension means comprise a separable bridge member having: second platform track means and means for releasably connecting said bridge member to the first mentioned riser and platform track means with the two platform track means parallel and located at the same height above second base means.

4. A wheel ramp as set forth in claim 3, wherein said bridge member consists of side frames supporting the second platform track means and wherein said riser and platform track means of the ramp have an overall width less than the spacing defined between said side frames of the bridge member whereby the ramp may be stored within the bridge member.

5. A wheel ramp as set forth in claim 1, wherein the ramp is made of welded steel tubing with the platform and riser track means include a plurality of bars extending transversely of the ramp at intervals along the riser and platform track means.

* * * * *